(12) United States Patent
Gerring et al.

(10) Patent No.: US 6,692,391 B2
(45) Date of Patent: Feb. 17, 2004

(54) TOOL FOR INSTALLATION AND REMOVAL OF POWER TRANSMISSION BELTS

(75) Inventors: Doug G. Gerring, Holly, MI (US); David E. Gardner, Royal Oak, MI (US); Brian A. Brundage, Clarkston, MI (US)

(73) Assignee: Dayco Products, LLC, Miamisburg, OH (US)

( * ) Notice: Subject to any disclaimer, the term of this patent is extended or adjusted under 35 U.S.C. 154(b) by 17 days.

(21) Appl. No.: 10/140,048

(22) Filed: May 7, 2002

(65) Prior Publication Data

US 2003/0211910 A1 Nov. 13, 2003

(51) Int. Cl.[7] ................................................. F16H 7/22
(52) U.S. Cl. ....................................... 474/130; 254/250
(58) Field of Search ............................ 474/130, 129, 474/131, 132; 254/250; 29/809

(56) References Cited

U.S. PATENT DOCUMENTS

| | | | |
|---|---|---|---|
| 1,250,571 A | * 12/1917 | Fay ............................. | 474/130 |
| 2,195,359 A | * 3/1940 | Coe et al. ................... | 474/130 |
| 2,470,810 A | 5/1949 | Engard et al. | |
| 2,505,216 A | 4/1950 | Simmons et al. | |
| 2,621,529 A | 12/1952 | Hawkins | |
| 2,924,106 A | * 2/1960 | Carriveau ................... | 474/130 |
| 3,951,006 A | 4/1976 | Fisher et al. | |
| 4,325,703 A | * 4/1982 | Phillips ....................... | 474/130 |
| 5,653,654 A | * 8/1997 | Davis .......................... | 254/250 |
| 6,033,331 A | 3/2000 | Winninger et al. | |
| 6,080,072 A | * 6/2000 | Michikura et al. .......... | 474/101 |
| 6,402,649 B1 | * 6/2002 | Amkreutz ................... | 474/130 |

FOREIGN PATENT DOCUMENTS

| | | | | |
|---|---|---|---|---|
| JP | 57-22450 A | * 2/1982 | ................. | 474/130 |
| JP | 09-242834 A | * 9/1997 | ............. | F16H/7/24 |
| JP | 10-259862 A | * 9/1998 | ............. | F16H/7/24 |

* cited by examiner

Primary Examiner—Marcus Charles
(74) Attorney, Agent, or Firm—Joseph V. Tassone; J. Daniel Lykins

(57) ABSTRACT

A tool for installation and removal of power transmission belts from fixed center pulleys in a power transmission system. The tool consists of a principal member for attaching to a pulley, thus absorbing forces created during installing and removing belts, and simplifying the process. Separate installing and removing devices are secured to the principal member and all configured to support and maneuver the belt while installing onto, or removing from, the selected pulley.

37 Claims, 4 Drawing Sheets

TOOL FOR INSTALLATION AND REMOVAL OF POWER TRANSMISSION BELTS

BACKGROUND OF THE INVENTION

1. Field of the Invention

This invention relates to a tool for installing and removing power transmission belts from fixed center pulleys. It is particularly directed to continuous belts having an inner multi-rib construction adapted to engage pulleys which have a matching set of V-grooves. A typical v-ribbed belt system is shown, for example in Fisher et al., U.S. Pat. No. 3,951,006. In this system, pulleys are coupled to the engine drive shaft and to such accessory drives as the alternator, water pump, power steering pump, or air conditioning compressor. The belt is operated over the drive shaft pulley and drives the accessories provided in the system. Although the above referenced patent also utilizes a tensioner applied to the outer surface of the belt, such a device is not always required. The term "multi-rib" is understood to mean a belt having its inner drive surface formed of a plurality of V-shaped or trapezoidal members shaped driving members designed to inter-fit with associated pulley grooves.

Tools of this type are necessary to install the belt over the various pulleys in the system, and also to remove the belt, and must be capable of accomplishing this with minimum effort and damage to the belt. The tool may also be used to test special accessory drive configurations, such as during a routine hot test after engine assembly. For example, it may be desired to test a water pump, in which case only the water pump is installed and the tool is applied only to the pulley which is attached to this pump.

2. Prior Art Statement

It is been known to utilize simple hand tools for the purpose of installing a conventional power transmission V-belt having a single trapezoidal drive section. This is done by the use of a wedging tool such as shown in Engard et al., U.S. Pat. No. 2,470,810 and Hawkins, U.S. Pat. No. 2,621,529. A variation of these wedging devices is shown in Simmons et al., U.S. Pat. No. 2,505,216 wherein a tool having a curved cam surface is used to permit the single section belt to slide over this surface onto the pulley.

It is an entirely different problem to install a multi-rib belt, however, and one such device is shown in Winninger, et al., U.S. Pat. No. 6,033,331, wherein a similar wedging tool is used to position a multi-rib belt onto a pulley. In all of the above patents the tool is not secured to any member of the drive system, and must be operated without any support, making the operation more difficult.

SUMMARY OF THE INVENTION

The present invention is an improvement over the prior art and provides for a tool which has a principal member to be mounted directly on one of the accessory drive pulleys and secured thereto, thereby providing a secure support for the tool. This makes it easier to operate and to control the belt. The principal member has a plurality of circular openings for insertion of either an installing device which allows the belt to be stretched and installed on the selected pulley; or a removal device which enables a belt to be stretched and removed from the pulley. The principal member also comprises a control member, such as a pair of handles, which are used to rotate and manipulate the principal member into the desired installing and removal positions of the belt. To install the belt around the pulleys, the installing device is first inserted into one of the circular openings by utilizing an integral pin on the device. This is inserted into whichever of the openings that provides clearance in the drive system. At the same time, other members will lock the installing tool in place so that it will not fall out. The principal member has an external cylindrical shaft which is inserted into the inner circular opening of the pulley. In order to lock the cylindrical shaft in place within the pulley, a bolt in the principal member is tightened, this bolt being connected via a wedging nut to locking members within the surface of the principal member. This rotation expands the locking members to lock them in place within the pulley. The belt is placed loosely around the other pulleys in the drive, then around the installing tool surface, which is designed with a curved cam configuration. At this point the belt is located outwardly of the pulley flanges.

The handles are rotated and manipulated so that the belt is slid over the ramp surface of the installing tool and onto the belt-engaging surface of the pulley. The ramp provides support to the inner surface of the belt, while simultaneously wrapping the belt around the installation pulley. This insures inter-engagement of the ribs of the belt and the grooves of the pulley. The tool is then disengaged by loosening the bolt to release the locking members which will then no longer be locked within the inner pulley surface. The power transmission system is then in condition for operation.

The removal of the belt is accomplished by placing the belt removal attachment in the same manner as the installing device. This device also has an integral cylindrical pin which is inserted into one of the circular openings in the principal member. This device has a belt-supporting surface which is similar to that of the installing device, with a concave surface acting as a cam or ramp. The configuration of this surface is slightly different than that of the installing device, in order to facilitate removal of the belt. To remove the belt, the principal member is again placed within the pulley, and the bolt is tightened to lock the principal member with the pulley as before. The principal member is rotated, using the handles, forcing the cam surface under the belt, so that the belt is twisted and stretched during this manipulation and the belt is slid from the pulley onto the removal device, thus removing it from pulley contact.

It is a principal object of this invention to provide a tool for installing and removing a power transmission belt without damaging the belt or other components.

It is a further object to operate the tool in a simple manner without other tools.

It is a further object to provide the tool with a secure mounting base to accomplish its purpose.

It is another object to provide the tool with separate installation and removal devices which may be locked in place.

These and other objects of the invention will become apparent from viewing the principal embodiment shown and described herein.

DESCRIPTION OF THE PREFERRED EMBODIMENTS

Figure 1:
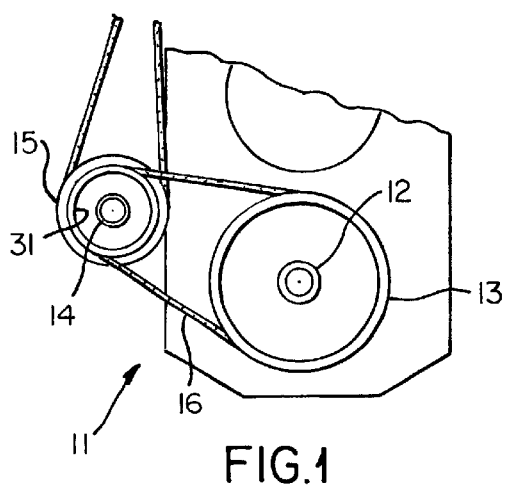
FIG. 1 is a partial view of a typical power transmission system.

As shown in FIG. 1, a power transmission system 11 comprises a power drive source 12 having a pulley 13 coupled thereto. An accessory drive 14 having a pulley 15 coupled thereto is representative of one type of accessory drive which may be used in the system; in this instance the accessory is a water pump. A continuous power transmission belt 16 has an inner surface operably connected to the pulleys so that the power drive source 12 is able to drive the accessory drive 14. In the system shown herein, the belt 16 is of the multi-rib type, meaning one having its inner drive surface formed of a plurality of ribs which are V-shaped or trapezoidal in cross-section, such as shown in the above-referenced Fisher patent. These ribs are designed to inter-fit with associated grooves in the pulleys. However, it should be understood that other types of belts, such as conventional trapezoidal cross-section belts, referred to as V-belts, may also be utilized in practicing this invention.

Figure 4:
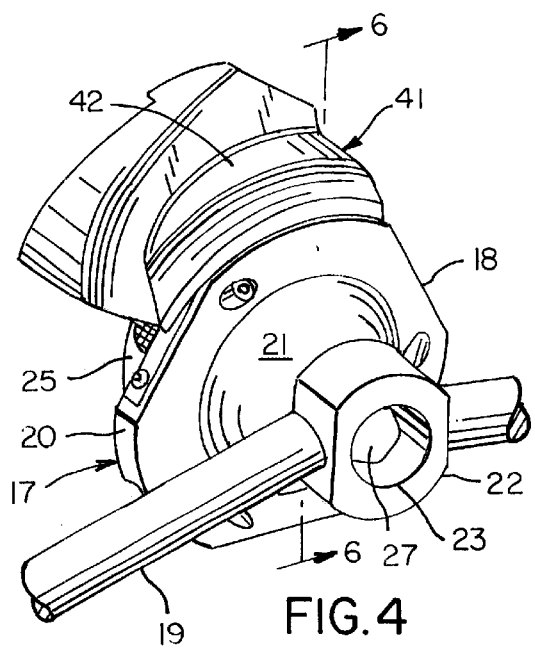
FIG. 4 is a view similar to FIG. 2 showing the tool with the removal device mounted on the principal member of the tool.
Figure 3:
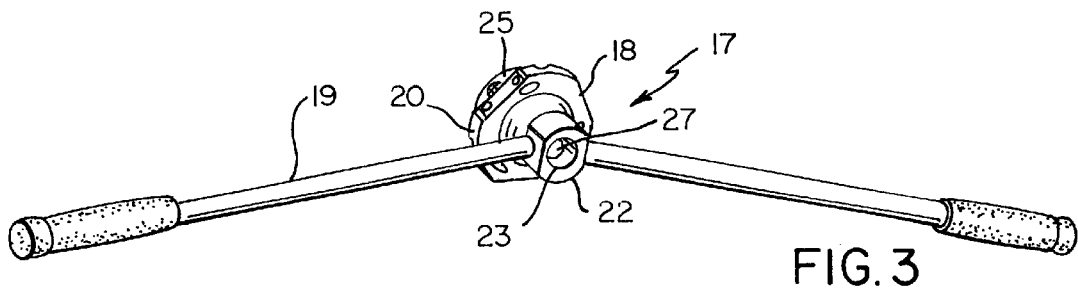
FIG. 3 is a view of the control member for the tool.
Figure 2:
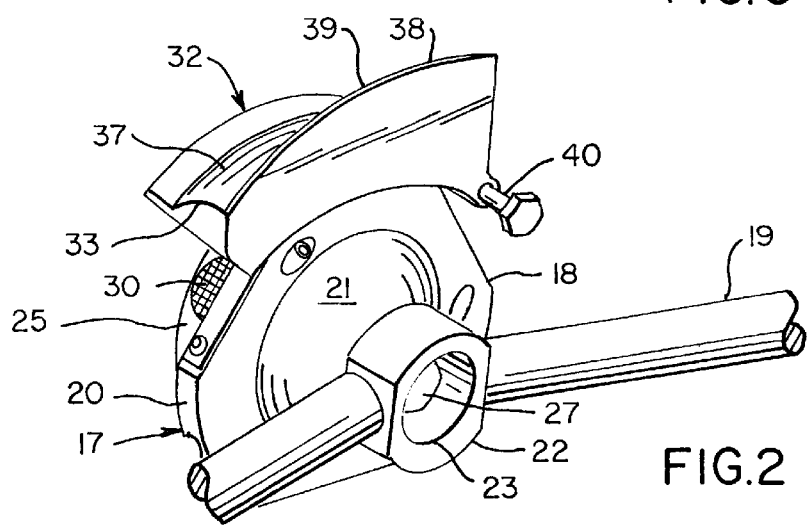
FIG. 2 is a perspective view of the tool with the installation device mounted on the principal member.
Figure 6:
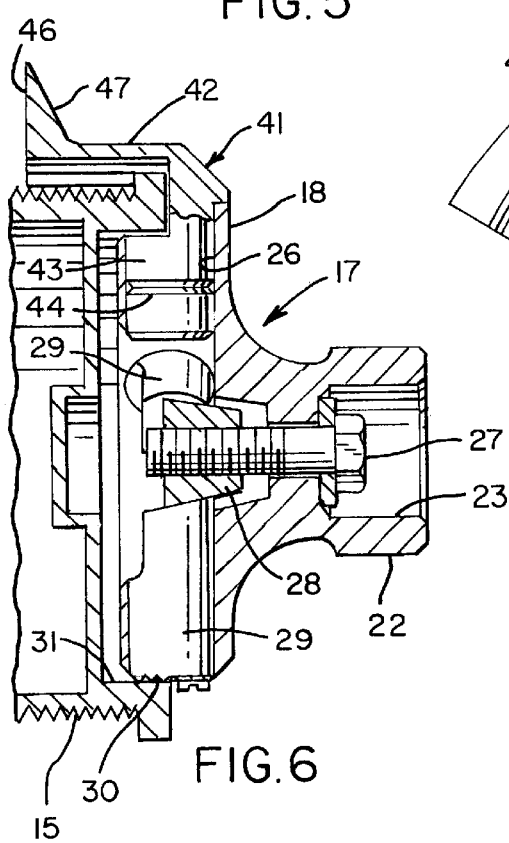
FIG. 6 is a sectional view taken along lines 6—6 of FIG. 4.

The belt 16 is installed onto the pulley 15, or removed therefrom by means of the novel tool 17, consisting of a principal member 18, best shown in FIGS. 2 and 4, and having a control member 19 secured thereto for the purpose of rotating the tool as will be further described below. As best shown in FIGS. 2 and 6, the principal member 18 comprises a generally cylindrical boss 20 having an outwardly facing surface directed away from the power transmission system having tapered section 21 terminating in a smaller diameter cylindrical shaft 22. An opening 23 extends into the shaft 22 the opposite or inwardly directed boss has a shoulder 24 which defines a smaller diameter cylindrical segment 25. Three circular cross-section holes 26 extend through the boss 20, so that the installing and removal devices may be inserted into a selected one of these holes. A hex-headed bolt 27 is inserted into the opening 23 and passes through the principal member and into the interior of shaft 22, as best shown in FIG. 6. At the end of the bolt a nut 28 is threadedly attached. When the bolt is tightened clockwise, the nut is drawn forward and bears against three locking members 29 which contact and push against the retaining plates 30. The smaller segment 25 is adapted to be placed within an opening transversely located in the central shaft of the pulley, the locking members 29 are pushed against the surfaces 31 which define the opening, to enable the tool to be locked against the inner surface 31 of the opening. The handle 19 is secured to the shaft 22 by either welding or by forming it of two separate members and screwing them into the shaft. The principal member and the shaft may be made of a metal such as steel or aluminum, or of a high impact plastic such as ABS.

Figure 5:
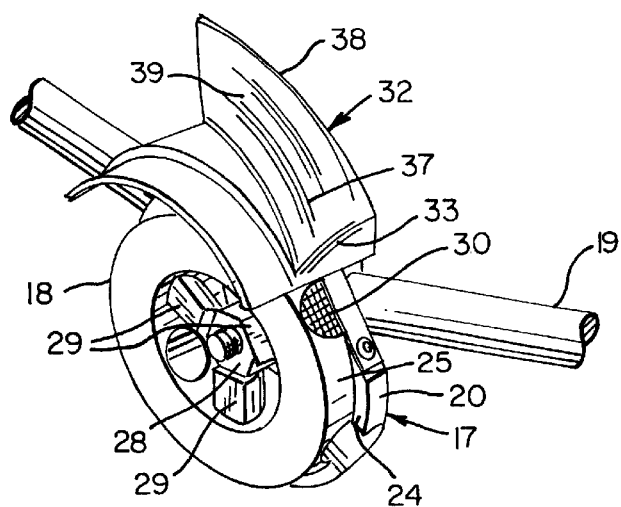
FIG. 5 is another perspective view showing the installing device mounted on the tool, and the locking members therefor.
Figure 7:
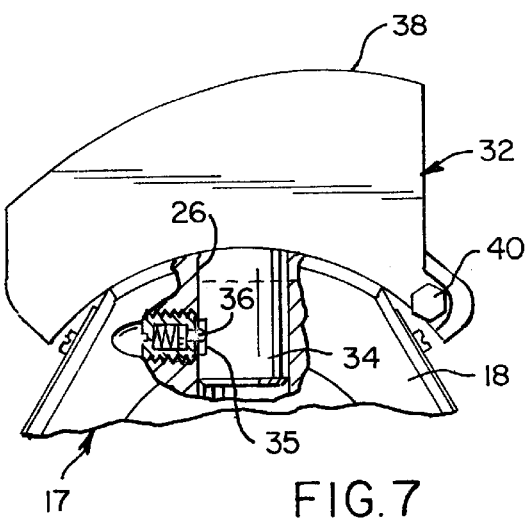
FIG. 7 is a view in partial section showing the installing device and means locking to the principal member.

The installing device is designated by reference numeral 32 and is shown in detail FIGS. 2, 5, and 7. This consists of the belt-supporting ramp segment 33 and an integral cylindrical pin 34 extending inwardly from the segment 33, and adapted to fit into the holes 26. This device may also be made of metal or high impact plastic. The pin 34 has a notch 35 in its outer surface, and when the pin is inserted into one of the holes, this notch acts as a locking member by use of a spring-loaded pin 36 as shown in FIG. 7 which is urged into the notch by the force of the spring. The ramps segment 33 has a curved arcuate surface 37 for supporting the belt during installation, and a wall 38 extending radially outwardly therefrom and located on that portion of the surface which is away from the pulley on which the principal member is mounted. The inner surface 39 of the wall has a ramp configuration that changes from concave to convex to facilitate the operation, as will be explained below. A pin 40 is mounted adjacent the wall and extends in a transverse direction outwardly of the wall to further facilitate installation of the belt.

Figure 8:
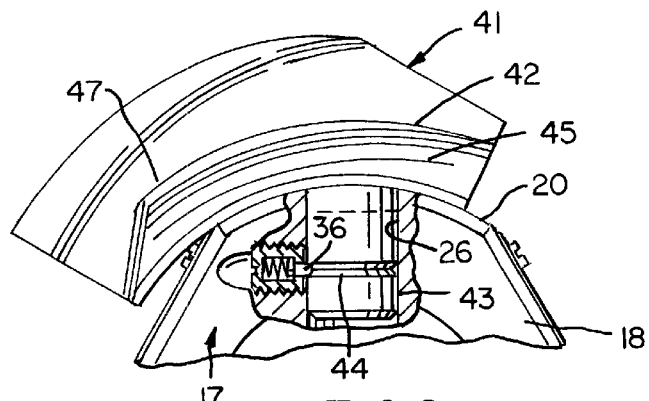
FIG. 8 is a view similar to FIG. 7 showing the means for locking the removal device to the principal member.

The removal device which is installed into the principal member 18 is shown in detail in FIGS. 4, 5, 6, and 8. This device is similar to the installing device, and can be made of the same material, but has a different ramp configuration to facilitate removal of the belt from the pulley. The device consists of a belt-supporting ramp segment 42 and an integral cylindrical pin 43 extending inwardly from segment 42 and adapted to fit into the holes 26. The pin 43 has a groove 44 extending around the peripheral surface of the pin and when it is inserted into one of the holes, the spring-loaded pin 36 locks into the groove, as shown in FIG. 8. The ramp segment 42 has a curved arcuate surface 45 for supporting the belt during removal, and a wall 46 extends radially outward therefrom and is located on that portion of the surface which is toward the pulley on which the tool is mounted. The inner surface 47 of the wall also has a compound curved configuration to facilitate removal, as will be described below.

Installing Operation

Figure 10:
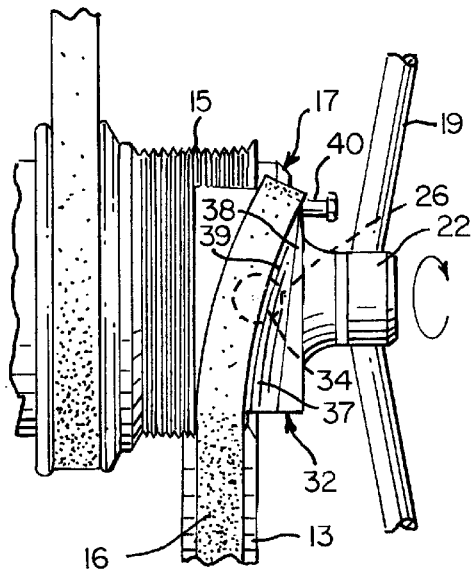
FIG. 10 is a view of the installation of FIG. 9 looking in the direction of the line 10—10.
Figure 9:
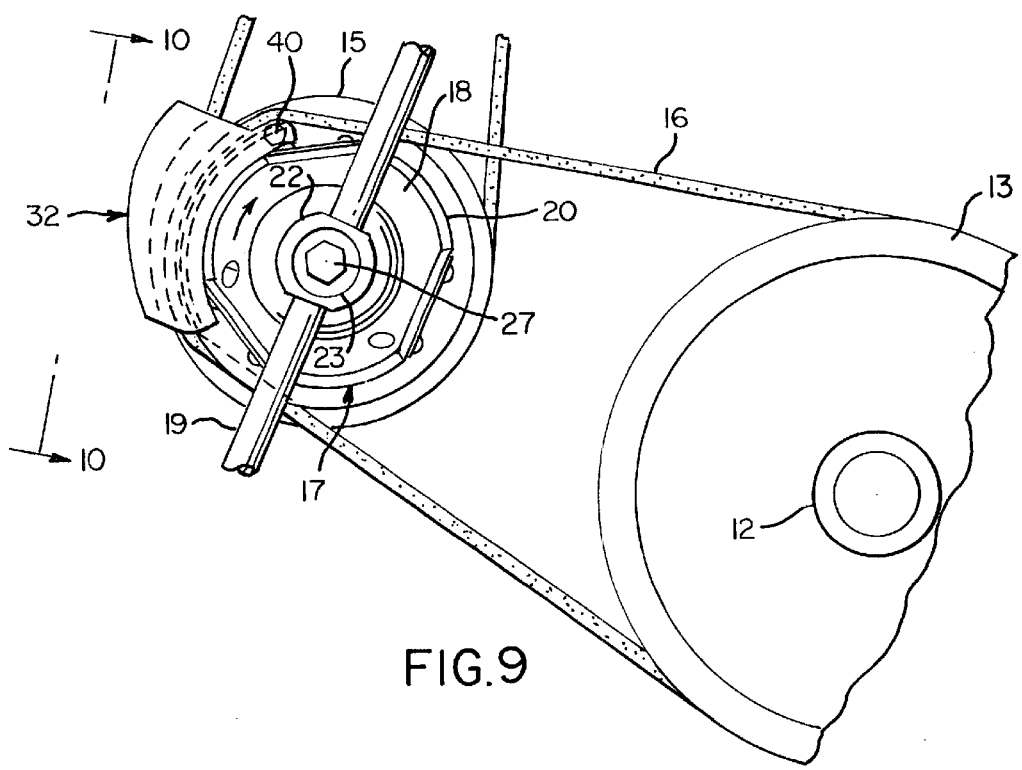
FIG. 9 is an elevation illustrating the installation of the belt from the installing device onto the pulley.

This is shown in sequence in FIGS. 9 and 10. The installing device 32 is inserted into the principal member by inserting the pin member 34 into one of the three holes 26, depending on required clearance in the system. The spring-loaded pin 36 locks this in place by insertion into the notch 35; the use of a notch instead of a groove permits more freedom of movement of this device on the principal member. As shown, the wall 38 is longitudinally outward of the pulley. The tool is attached by inserting the cylindrical segment 25 into the central pulley opening defined by surface 31, using the handle 19 for this purpose. The bolt 27 is tightened by rotating it clockwise, which simultaneously moves the wedging nut 28. This in turn pushes the locking members 29 outward against the pulley surface 31 to lock the principal member into the pulley opening. By manually grasping the handle, the entire tool is rotated in a clockwise direction to force the ramp support surface 37 over the belt 16 and maneuvered so that the inner drive surface of the belt contacts the pulley grooves. The inner surface 39 of the wall 38 and the pin 40 assist in this maneuver so that the belt clears the outer pulley flange. The wall keeps the belt on the support surface 37. The belt is stretched during this procedure and the forces created thereby are transmitted through the locking members 29 into the pulley. The tool is then removed for operation of the system.

Removal Operation

Figure 13:
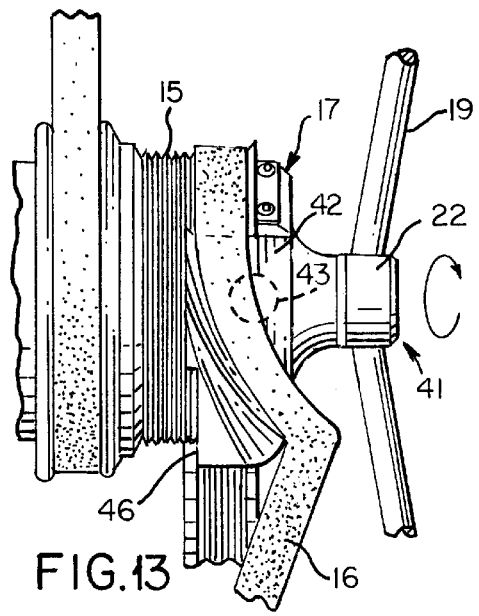
FIG. 13 is a view of the removal step of FIG. 12, looking in the direction of line 13—13.
Figure 11:
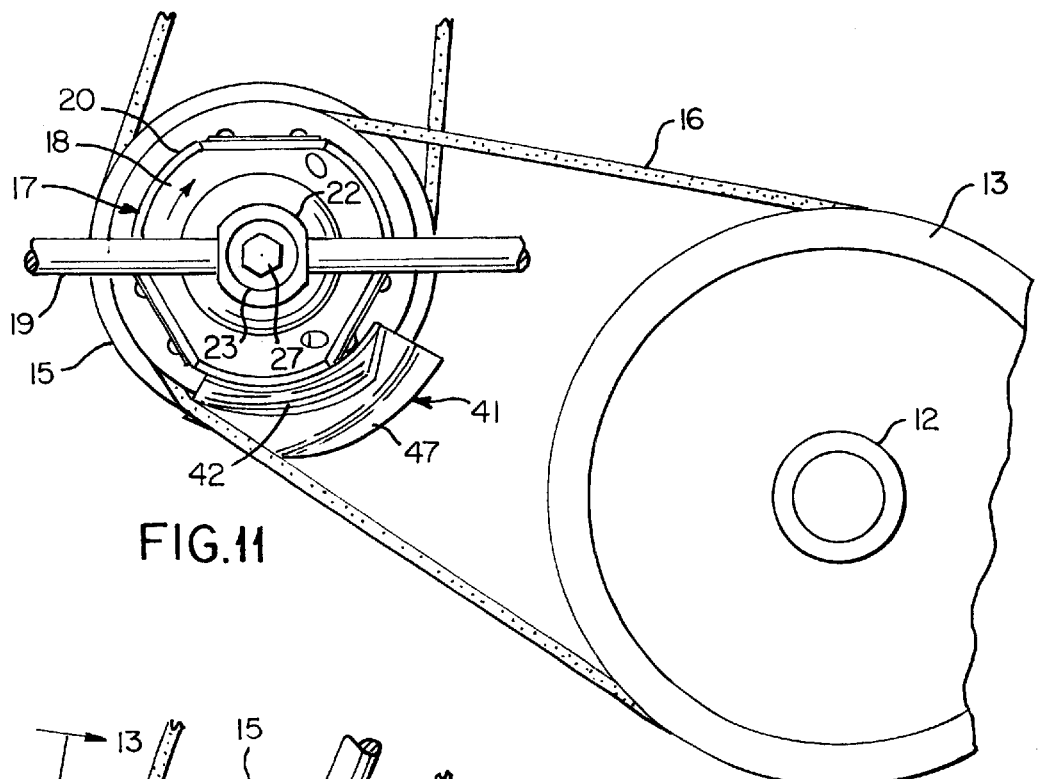
FIG. 11 is an elevational view showing the first step in removing the belt from the pulley to the removal device.
Figure 12:
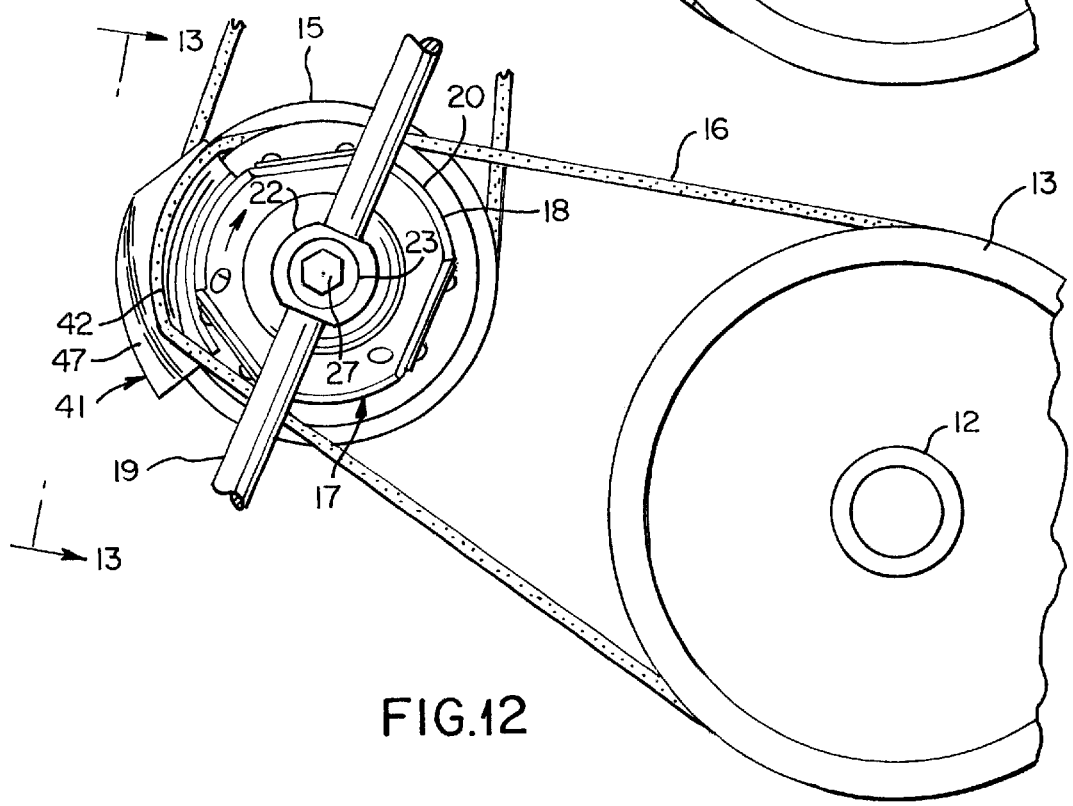
FIG. 12 is a view similar to FIG. 11, showing a further step in removing the belt.

This is shown in sequence in FIGS. 11, 12 and 13. The removal device 41 is installed in the same manner as the installing device, by inserting the pin member 43 into a selected one of the holes 26 depending on the clearance in the system. The pin member is locked in place by means of the spring loaded pin 36 which drops into the groove 44. The tool is attached to the pulley in the same manner as described above with respect to the installing tool. The relationship of these parts is shown in FIGS. 4 and 6. The handles are rotated clockwise to place the ramp support surface 45 under the inner surface of the belt and the belt is then stretched out by this maneuver, and moved away from the pulley while being forced in this direction by the surface 47 of the wall 46. The belt is then removed from the ramp surface. As before, the stretching forces are absorbed through the locking members into the pulley.

It can thus be seen that this tool provides proper support during installing and removing the belt into or from the power transmission system, utilizing the necessary devices in a convenient manner.

We claim:

1. In a power transmission system comprising a power drive source having an associated pulley coupled thereto, at least one accessory drive device having an associated pulley coupled thereto, and a continuous drive belt having an inner surface operably connected to said pulleys, and means for engaging a selected one of said accessory drive device pulleys to selectively install or to remove said belt over said selected pulley; the improvement wherein said means comprises a principal member applied to said selected pulley, a first separate installing device mounted on said principal member, to support said belt and install it on said pulley, and a second separate removal device for removal of said belt from said pulley and onto said removal device.

2. The system of claim 1 further comprising a control member secured to said principal member for mounting said means on said selected pulley.

3. The system of claim 1, wherein said means comprise locking members for securing said principal member to said selected pulley.

4. The system of claim 3 wherein said selected pulley comprises a central member and has a transverse opening therein and surfaces defining said opening, said locking members engaging said surfaces to secure said principal member to said selected pulley.

5. The system of claim 4 further comprising an adjustable member contacting said locking members to cause said engagement with said surfaces.

6. The system of claim 5 wherein said principal member has an opening transversely therein, and said adjustable member is located within said opening.

7. In a power transmission system comprising a power drive source having an associated pulley coupled thereto, at least one accessory drive device having an associated pulley coupled thereto, and a continuous drive belt having an inner surface operably connected to said pulleys, and means for engaging a selected one of said accessory drive device pulleys to selectively install or to remove said belt over said selected pulley; the improvement wherein said means comprises a principal member applied to said selected pulley, a first separate installing device mounted on said principal member to support said belt and install it on said pulley, and a second separate removal device for removal of said belt from said pulley and onto said removal device, said principal member further comprising a plurality of openings located radially in said principal member to provide for mounting said separate installing and removal devices.

8. The system of claim 7 wherein said installing and removal devices each comprise a belt-supporting member and an integral insertion member placed into a selected one of said openings.

9. The system of claim 8 further comprising locking means in said principal member, and receiving means on the surface of said insertion member for locking said insertion member into said selected opening.

10. The system of claim 9 wherein said locking means comprises a spring-loaded pin.

11. The system of claim 9 wherein said receiving means on said installing device comprises a notch.

12. The system of claim 9 wherein said receiving means on said removal device comprises a groove.

13. The system of claim 8 wherein said belt-supporting member has an arcuate belt-supporting ramp surface.

14. The system of claim 13 wherein said belt-supporting member has a wall upon and extending radially outwardly from said ramp surface to retain said belt during operation of the tool.

15. The system of claim 14 wherein said wall on said installing device is located at the portion of said belt-supporting surface which is farther away from said selected pulley.

16. The system of claim 14 wherein said wall on said removal device is located at the portion of said belt-supporting surface which is closer to said selected pulley.

17. The system of claim 14 wherein said wall has an inner surface having a ramp configuration cooperating with said belt-supporting ramp surface for removal of said belt.

18. In a power transmission system comprising a power drive source having an associated pulley coupled thereto, at least one accessory drive device having an associated pulley coupled thereto, and a continuous drive belt having an inner surface operably connected to said pulleys, and means for engaging a selected one of said accessory drive device pulleys; the improved method steps of installing said belt on said selected pulley by providing a principal member on said means, mounting a separate installing device on said principal member, locking said principal member onto said selected pulley, placing said drive belt on said installing device, and installing said drive belt onto said pulley by manipulating said means.

19. In the power transmission system of claim 18 wherein said installing device comprises a belt supporting member having an arcuate ramp surface and a radially outwardly extending wall on said surface; said installing step composing placing said drive belt on said ramp surface, utilizing said wall to retain said drive belt on said surface, and stretching said drive belt while sliding it from said surface onto said pulley.

20. In a power transmission system comprising a power drive source having an associated pulley coupled thereto, at least one accessory drive device having an associated pulley coupled thereto, and a continuous drive belt having an inner surface operable connected to said pulleys, and means for engaging a selected one of said accessory drive device pulleys; the improved method steps of removing said belt from said pulley by providing a principal member on said means, mounting a separate removal device on said principal member, locking said principal member onto said selected pulley, placing said drive belt on said removal device, and removing said drive belt from said pulley by manipulating said means.

21. In the power transmission system of claim 20 wherein said removal device comprises a belt-supporting member having an arcuate ramp surface and a radially outwardly extending wall on said surface; said removing step comprising placing said drive belt on said ramp surface, utilizing said wall to retain said drive belt on said surface, and stretching said drive belt while sliding it from said pulley onto said removal device.

22. The method according to claim 18 or claim 20 comprising the further steps of providing a control member on said principal member, and manually grasping said control member to manipulate said means.

23. The method according to claim 18 or claim 20 comprising the further steps of providing locking members on said means for securing said means to said selected pulley.

24. The method according to claim 23 wherein said selected pulley comprises a central member and a transverse opening therein and surfaces defining said opening; comprising the further steps of engaging said locking members against said surfaces to secure said means on said selected pulley.

25. The method according to claim 18 or claim 20 wherein said principal member comprises a generally cylindrical member having a plurality of openings extending radially therein; comprising the further step of installing said device in a selected one of said openings.

26. The method according to claim 25 wherein said device comprises a belt-supporting member and an integral cylindrical insertion member; said step of installing said device comprising placing said insertion member into said selected one of said openings.

27. The method according to claim 21 wherein said principal member comprises a locking member and said insertion member comprises a receiving means; comprising the further step of inter-engaging said locking member and said receiving means to lock said insertion member into said selected one of said openings.

28. In a power transmission system comprising a power drive source having an associated pulley coupled thereto, at least one accessory drive device having an associated pulley coupled thereto, and a continuous drive belt having an inner surface operably connected to said pulleys, and means for engaging a selected one of said accessory drive device pulleys; the improved method steps of installing said belt on said selected pulley by providing a principal member on said means, mounting a separate installing device on said principal member, locking said principal member onto said selected pulley, placing said drive belt on said installing device, and installing said drive belt onto said pulley by manipulating said means, said method comprising the further steps of providing locking members on said means for securing said means to said selected pulley and providing an adjustable member and providing an adjustable member on said principal member for contacting said locking members, and operating said adjustable member to selectively engage said principal member to said pulley opening surface.

29. In the power transmission system of claim 28 wherein said installing device comprises a belt supporting member having an arcuate ramp surface and a radially outwardly extending wall on said surface; said installing step comprising placing said drive belt on said ramp surface, utilizing said wall to retain said drive belt on said surface, and stretching said drive belt while sliding it from said surface onto said pulley.

30. In a power transmission system comprising a power drive source having an associated pulley coupled thereto, at least one accessory drive device having an associated pulley coupled thereto, and a continuous drive belt having an inner surface operable connected to said pulleys, and means for engaging a selected one of said accessory drive device pulleys; the improved method steps of removing said belt from said pulley by providing a principal member on said means, mounting a separate removal device on said principal member, locking said principal member onto said selected pulley, placing said drivebelt on said removal device, and removing said drive belt from said pulley by manipulating said means, said method comprising the further steps of providing locking members on said means for securing said means to said selected pulley and providing an adjustable member on said principal member for contacting said locking members, and operating said adjustable member to selectively disengage said principal member from said pulley opening surface.

31. In the power transmission system of claim 30 wherein said removal device comprises a belt-supporting member having an arcuate ramp surface and a radially outwardly extending wall on said surface; said removing step comprising placing said drive belt on said ramp surface, utilizing said wall to retain said drive belt on said surface, and stretching said drive belt while sliding it from said pulley onto said removal device.

32. The method according to claim 28 or claim 30 comprising the further steps of providing a control member on said principal member, and manually grasping said control member to manipulate said means.

33. The method according to claim 28 or claim 30 comprising the further steps of providing locking members on said means for securing said means to said selected pulley.

34. The method according to claim 33 wherein said selected pulley comprises a central member and a transverse opening therein and surfaces defining said opening; comprising the further steps of engaging said locking members against said surfaces to secure said means on said selected pulley.

35. The method according to claim 28 or claim 30 wherein said principal member comprises a generally cylindrical member having a plurality of openings extending radially therein; comprising the further step of installing said device in a selected one of said openings.

36. The method according to claim 35 wherein said device comprises a belt-supporting member and an integral cylindrical insertion member, said step of installing said device comprising placing said insertion member into said selected one of said openings.

37. The method according to claim 36 wherein said principal member comprises a locking member and said insertion member comprises a receiving means; comprising the further step of inter-engaging said locking member and said receiving means to lock said insertion member into said selected one of said openings.

* * * * *